United States Patent

Quermann

[15] 3,677,097
[45] July 18, 1972

[54] PROTECTIVE STOPS FOR A FLEXURE SUSPENDED GYROSCOPIC ROTOR

[72] Inventor: Thomas R. Quermann, Huntington Station, N.Y.

[73] Assignee: Sperry Rand Corporation

[22] Filed: March 5, 1971

[21] Appl. No.: 121,424

[52] U.S. Cl. ................................................................74/5
[51] Int. Cl. ........................................................G01c 19/18
[58] Field of Search ...........................74/5, 5.4; 308/2 A

[56] References Cited

UNITED STATES PATENTS 3,081,552  3/1963  Reason ................................74/5 X
3,529,477  9/1970  Quermann ..............................74/5

Primary Examiner—Manuel A. Antonaras
Attorney—S. C. Yeaton

[57] ABSTRACT

Gyroscopic apparatus having a rotor suspended by axial and radial flexure supports including a spherical shaped hub for limiting the translational deflection of the rotor with respect to a drive shaft, a plurality of leaf springs for limiting the relative angular deflection of the rotor with respect to the drive shaft and stop pins in combination with leaf springs for minimizing the relative rotational displacement of the drive shaft with respect to the rotor.

5 Claims, 3 Drawing Figures

INVENTOR
THOMAS R. QUERMANN
BY
ATTORNEY

INVENTOR
THOMAS R. QUERMANN
BY
ATTORNEY

PROTECTIVE STOPS FOR A FLEXURE SUSPENDED GYROSCOPIC ROTOR

BACKGROUND OF THE INVENTION

1. Field of the Invention

The present invention pertains to the field of gyroscopic devices and particularly to such devices having flexibly suspended rotors.

2. Description of the Prior Art

This invention is an improvement in the gyroscopic device described in U.S. Pat. No. 3,529,477 of T. R. Quermann, the inventor of the subject invention, entitled "Gyroscopic Rotor Suspension". The radial and axial rotor flexure supports in the referenced patent may be subjected to excessive shocks in handling and during installation of the device. Excessive shocks along the spin axis increase the relative axial travel of the rotor with respect to the hub causing the axial flexure to break. Off-axis shocks cause elongation of the radial flexures resulting in breakage and continuous high rate slewing cause deflections of the rotor with respect to the hub. The rotor then repeatedly hits against deflection limit stops which couple the resulting impact back through the hub to the flexure supports. As a result, the fatigue limit of the flexure support material is exceeded and failures occur in the flexure supports. Further, during high rate slewing the rotor tends to wind up about the spin axis because of the relative velocities between the hub and the rotor thereby deforming the radial and axial flexure supports. The usual type of shock protection consisting of soft springs preloaded against hard stops are not practical in this instance since the high speed rotation requires a very stiff radial spring for stability.

SUMMARY OF THE INVENTION

A gyroscopic apparatus which includes a spinning rotor radially suspended by a first flexure to a drive shaft and a second flexure which axially supports the rotor on the drive shaft has a spherical shaped hub affixed to the drive shaft and disposed within a spherical cavity in the rotor. The spherical hub is centered with respect to the spin axis by a plurality of set screws which do not interfere with the relative motion between the rotor and the drive shaft. In handling an installation of the gyroscopic apparatus, when the rotor translates along the spin axis with respect to the drive shaft, as a result of excessive shocks, the spherical surfaces act as a stop to limit the amount of translation of the rotor and protect the flexures from excessive stress which may cause breakage. While operating, the rotor deflects with respect to the drive shaft around mutually perpendicular axes. Excessive deflection of the rotor is limited by a plurality of leaf springs affixed to the hub which limit the amount of deflection of the rotor with respect to the drive shaft. The leaf springs absorb a substantial portion of the shock resulting from the repeated impacts of the rotor against the leaf springs thereby minimizing the magnitude of the shock that is coupled back to the radial and axial flexure supports. During high rate slewing of the gyroscopic device, the stop springs contact the rotor on the side opposite the attachment point of the axial support flexure so that the slewing forces cause tensile stress in the support. Due to column action the axial flexure can support greater loads in tension than in compression without contacting the translational stop. One or more stop pins in combination with one or more leaf springs limit the relative rotational displacement of the rotor with respect to the drive shaft. When the velocities of the shaft and rotor differ, a stop pin makes contact with the edge of a leaf spring thereby causing the rotor and drive shaft to spin at the same velocity.

DESCRIPTION OF THE PREFERRED EMBODIMENT

Figure 1:
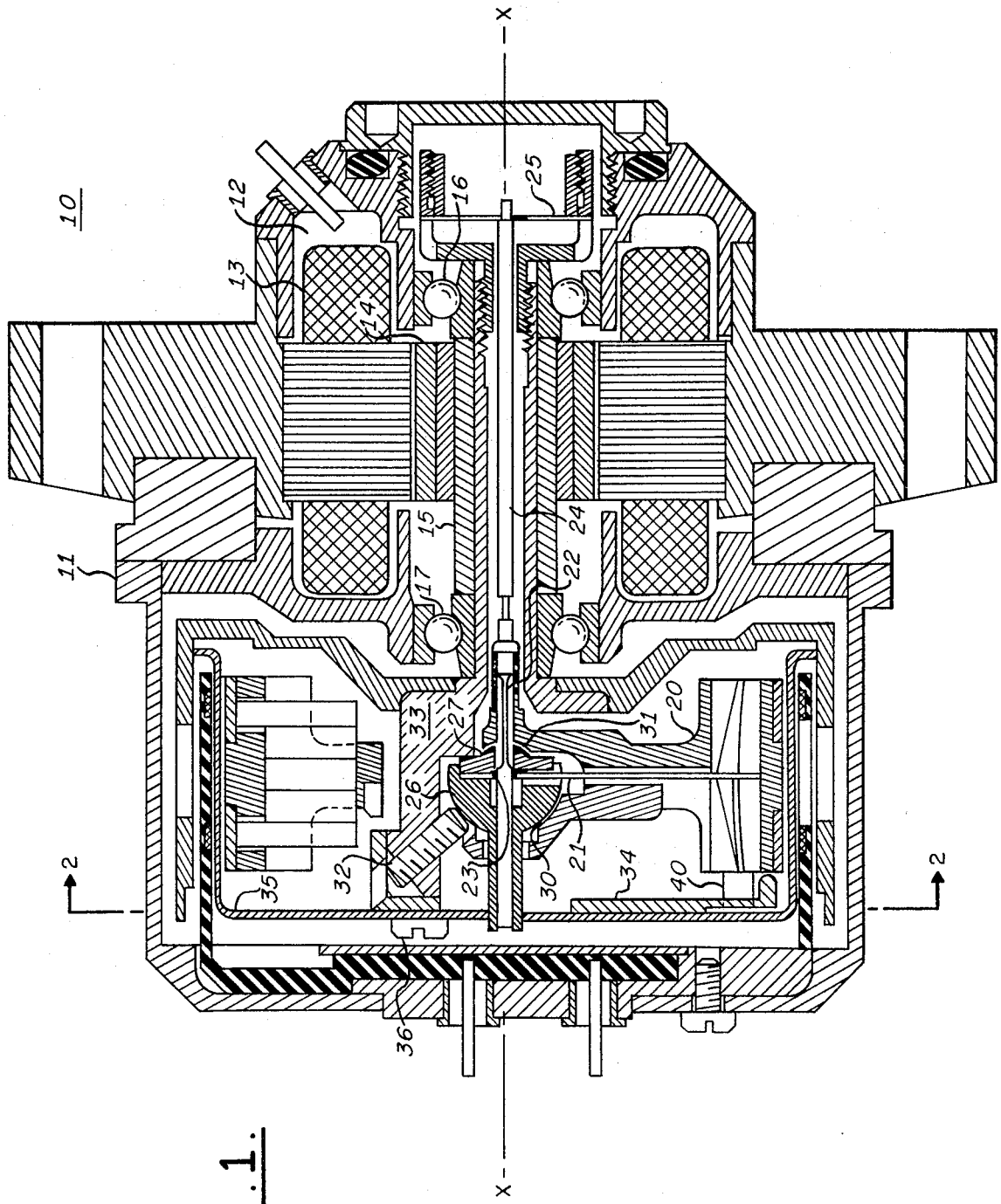
FIG. 1 is an elevation view in cross-section of a gyroscope having a radially and axially flexure supported rotor incorporating the protective stops.

The invention will be described with reference to FIG. 1 which shows a gyroscopic device 10 having a housing 11. A conventional synchronous motor 12 includes field coils 13 affixed to the inner wall of the housing 11. The coils 13 coact with an armature 14 mounted on a drive shaft 15 which is journalled in bearings 16 and 17 to rotate the drive shaft 15 about a spin axis X—X. The rotor 20 is radially suspended by a flexure support 21 which is shown more clearly in FIG. 2 to have three equiangularly disposed resilient ligaments, which flexibly support the gyroscopic rotor 20 about the spin axis X—X. The rotor 20 is also axially suspended by a flexure support 22 which extends through the aperture 23 in the radial flexure support 21. The axial flexure support 22 is coupled through another axial flexure support 24 to a resilient diaphragm 25.

The end of the radial flexure support 21 opposite the rotor 20 is secured between two hub members 26 and 27 which have spherical surfaces that conform to spherical surfaces 30 and 31 within the hub of the rotor 20. One end of the axial flexure strut 22 is secured within an extension of the hub member 26 while the other end of the flexible strut 22 is secured within an extension of the hub of the rotor 20. The hub members 26 and 27 are fixed between a set screw 32 and a flat surface of an outer hub or extension portion 33 of shaft 15.

Figure 3:
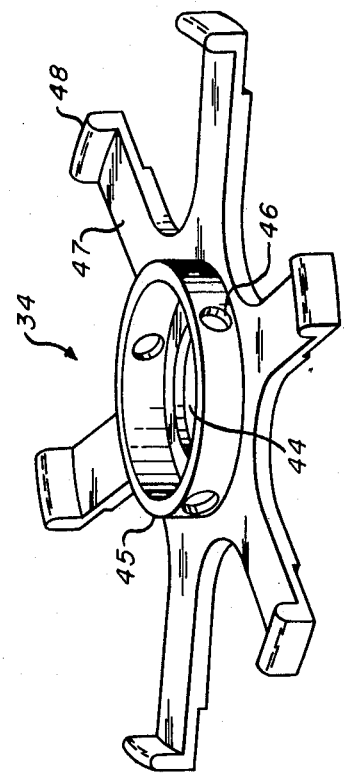
FIG. 3 is a detailed drawing of a stop spring.

A stop spring 34 and a shroud 35 are secured to the outer hub 33 by a plurality of screws 36. The stop spring 34 shown more clearly in FIG. 3 includes an aperture 44 disposed within a centralized cup area 45 which encloses the outer hub 33 and has a plurality of holes 46 located around its perimeter which enabled the set screws 32 to be inserted into the outer hub portion 33 and make contact with the spherical surface of the hub member 26. The stop spring 34 also includes a plurality of leaf springs 47 having perpendicular fingers 48 located at their extremities. The perpendicular fingers 48 provide a relatively small surface to make contact with the spinning rotor 20 which produces very little gaseous coupling during normal operation.

Stop pins 40 affixed to the outer rim of the rotor 20 have sufficient length to be able to make contact with the edges of the leaves 41 and 42 on the stop spring 34 under certain operating conditions. In addition, the stop pins 40 must be short enough so as not to make contact with the shroud 35 while the rotor is spinning.

The operation of the protective stops will first be described with respect to the spherical surfaces on the hub members 26 and 27. Assume an excessive shock is applied along the X—X axis in a direction causing the rotor 20 to translate so that the inner spherical surface 31 approaches the spherical surface of the hub member 27. Initially, the radial displacement between these two surfaces is on the order of 0.001 inch. Therefore, when the rotor translates towards the hub member 27, the inner surface 31 will make contact with the surface of the hub member 27 after it has travelled only approximately 0.001 inch. As a result, the axial flexure support 22 is not subjected to excessive stress from the translation of the rotor 20 along the X—X axis. In a similar manner, if the shock were in the opposite direction causing the inner spherical surface 30 to approach the spherical surface of the hub member 26, these surfaces would make contact before the rotor had travelled a sufficient distance to deform the axial flexure support 22. When the rotor is spinning the radial clearance between the spherical surfaces is sufficient in that it does not produce a detrimental effect on the operation of the device 10.

Figure 2:
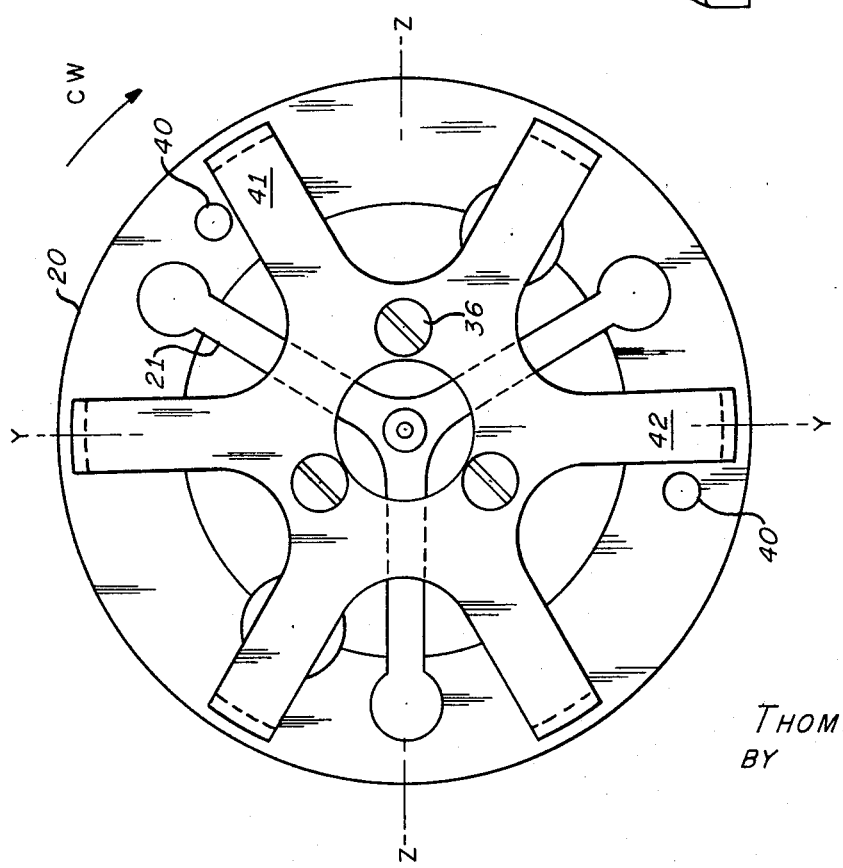
FIG. 2 is a cross-sectional view taken along lines A—A of FIG. 1 with the shroud omitted.

During operation of the gyroscopic device, when the rotor is spinning at a relatively high velocity, it tends to tilt about the mutually perpendicular axes Y—Y and Z—Z as shown in FIG. 2. In the presence of excessive tilt both the radial flexure support 21 and the axial flexure support 24 are subjected to repetitive bending that would eventually cause fatigue of the material. To counteract this eventuality, the stop spring 34 is provided to make contact with the weighted rim of the rotor 40 before the rotor tilts excessively about either the Y—Y or Z—Z axes. The extremity of each leaf spring 47 on the stop spring 34 is formed so that it does not make contact with the shroud 35. Therefore, during excessive tilting of the rotor 20, the outer rim alternately presses against the nearest finger at the extremity of each leaf spring 47 on the stop spring 34. The extremity of each leaf spring 47 deflects absorbing a substantial part of the impact resulting from the collision of the outer rim on the rotor 20 with the finger on each leaf spring 47 thereby minimizing the magnitude of the shock coupled back to the radial and axial support flexures 21 and 22.

During the high speed slewing of the shaft 15 the difference in rotational velocity between the rotor 20 and the shaft 15 causes a relative displacement between these components that results in a deformation of the radial flexure support 21 in the Y-Z plane. It also causes the axial flexure support 22 which is fixed on one end to an extension of the hub on the rotor 20 and on the other end is fixed to an extension of the hub member 26 to wind up about the X—X axis. The combination of the stop pins 40 and the stop spring 34 eliminate this effect when the rotation of the components is clockwise as shown in FIG. 2 by the stop pin 40 making contact with the proximate edge of the adjacent leaf spring 47 on the stop spring 34. As a result of this contact the shaft 15 and the rotor 20 are locked together and forced to rotate synchronously in the clockwise direction. Alternatively, if the rotation is counterclockwise as shown in FIG. 2, the stop pin 40 makes contact with the proximate edge of the adjacent leaf spring 47 on the stop spring 34. Again, forcing the shaft 15 and the rotor 20 to rotate synchronously but in the counterclockwise direction.

During normal operation of the gyroscopic device, the spherical stop surfaces on the hub members 26 and 27 are not in contact with the spherical surfaces 30 and 31 on the rotor 20 and hence have little effect on the performance of the gyroscopic device. In one embodiment of the invention, the additional damping due to the close proximity of the stop surfaces caused a drop in the gyro auto erect time constant from 60 to 45 seconds. A change of only 15 seconds. In this embodiment, the gap between the stop pins 40 and the edge of the leaf springs 41 and 42 was 0.007 inches, while the clearance between the fingers on the leaf springs and the weighted rim of the rotor 20 was 0.003 inches.

While the invention has been described in its preferred embodiment, it is to be understood that the words which have been used are words of description rather than limitation and that changes may be made without departing from the true scope and spirit of the invention in its broader aspects.

I claim:

1. In a gyroscopic device having a rotor flexibly suspended from a drive shaft, an apparatus for protecting the flexible suspension elements comprising,
   first limit means disposed between said rotor and said drive shaft for constraining the magnitude of translational displacement of said rotor with respect to said drive shaft,
   second limit means coupled to said drive shaft for controlling the magnitude of deflection displacement of said rotor with respect to said drive shaft, and
   third limit means secured to said rotor which coact with said second limit means to restrain within a specified range the amount of relative angular displacement of said rotor with respect to said drive shaft.

2. In a gyroscopic device as described in claim 1 in which said first limit means includes hub members coupled to said drive shaft having spherical surfaces proximate spherical cavity surfaces within said rotor.

3. In a gyroscopic device as described in claim 1 in which said second limit means includes a stop spring having a plurality of leaf springs which make contact with said rotor in controlling the deflection displacement of said rotor with respect to said drive shaft.

4. In a gyroscopic device as described in claim 3 in which said plurality of leaf springs each has a thin finger section that provides a relatively small contact surface to said rotor thereby minimizing the gaseous coupling of said stop spring on said rotor.

5. In a gyroscopic device as described in claim 1 in which said third limit means includes a stop pin secured to said rotor at a location that will produce contact with said second limit means after an allowable angular displacement has occurred between said rotor and said drive shaft.

* * * * *